(12) United States Patent
Sly et al.

(10) Patent No.: US 8,893,993 B2
(45) Date of Patent: Nov. 25, 2014

(54) METHODS FOR PULVERIZING MATERIALS

(71) Applicant: Reduction Engineering, Inc., Kent, OH (US)

(72) Inventors: Robert Sly, Kent, OH (US); Eric Gorham, Akron, OH (US); Larry Baker, Clinton, OH (US)

(73) Assignee: Reduction Engineering, Inc., Kent, OH (US)

( * ) Notice: Subject to any disclaimer, the term of this patent is extended or adjusted under 35 U.S.C. 154(b) by 239 days.

(21) Appl. No.: 13/648,092

(22) Filed: Oct. 9, 2012

(65) Prior Publication Data

US 2013/0270373 A1    Oct. 17, 2013

Related U.S. Application Data

(62) Division of application No. 12/713,377, filed on Feb. 26, 2010, now Pat. No. 8,282,031.

(51) Int. Cl.
*B02C 7/17* (2006.01)
*B02C 7/12* (2006.01)
*B23P 11/00* (2006.01)

(52) U.S. Cl.
CPC ... *B02C 7/12* (2013.01); *B02C 7/17* (2013.01); *B23P 11/00* (2013.01)
USPC ............... 241/23; 29/428; 241/30; 241/65; 241/261.2

(58) Field of Classification Search
USPC ............... 241/23, 65–67, 261.2, 261.3, 30; 29/428
See application file for complete search history.

(56) References Cited

U.S. PATENT DOCUMENTS

| | | | |
|---|---|---|---|
| 3,614,000 | A | 10/1971 | Blythe |
| 3,635,410 | A | 1/1972 | Smith |
| 4,018,388 | A | 4/1977 | Andrews |
| 4,428,536 | A | 1/1984 | Rodgers |
| 6,257,511 | B1 | 7/2001 | Turner |
| 6,450,428 | B1 | 9/2002 | Kelsey |
| 7,152,823 | B2 | 12/2006 | Kapper |
| 7,258,076 | B1 | 8/2007 | Gantt |
| 7,478,772 | B2 | 1/2009 | Wang |
| 2007/0080250 | A1 | 4/2007 | Kapper |

OTHER PUBLICATIONS

PCT—Notification of Transmittal International Search Report and Written Opinion, Oct. 6, 2011.
PCT—International Search Report, Oct. 6, 2011.
PCT—Written Opinion of the International Search Report, Oct. 6, 2011.

*Primary Examiner* — Mark Rosenbaum
(74) *Attorney, Agent, or Firm* — Wood, Herron & Evans, LLP

(57) ABSTRACT

This invention relates to the art of methods and apparatuses for grinding various materials into smaller particles; particularly, to those known in the art as pulverizing systems and devices. This invention provides methods and apparatuses for an improved disc mill assembly that utilizes a tapered flywheel and water jacket in conjunction with planar grinding disk cutting devices to create a tapered grinding channel.

20 Claims, 10 Drawing Sheets

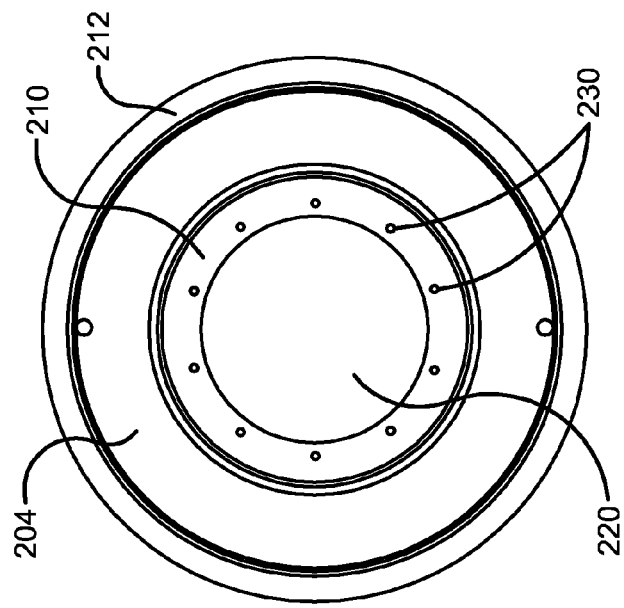
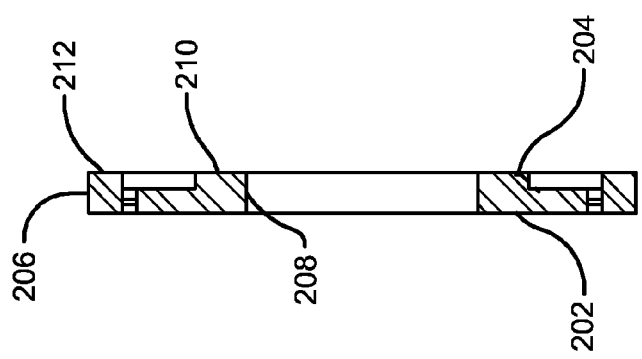
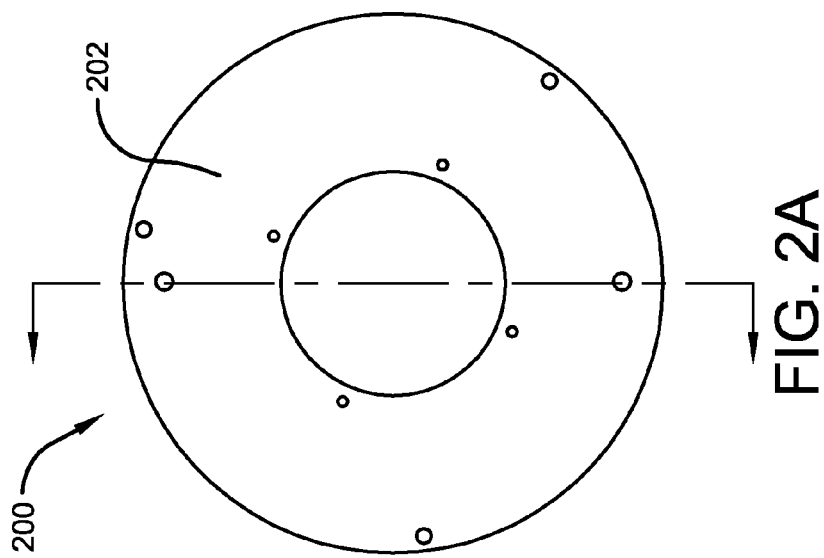
FIG. 2B
FIG. 2C
FIG. 2A

METHODS FOR PULVERIZING MATERIALS

I. BACKGROUND OF THE INVENTION

A. Field of Invention

This invention pertains to the art of methods and apparatuses for grinding various materials into smaller particles; particularly, to those known in the art as pulverizing systems and devices.

B. Description of the Related Art

Pulverizing systems with one or more disc mill assemblies are well known in the art. Pulverizing systems are used to grind pelletized or shredded plastics, nylons, polyesters and other polymers into powder; although it is to be understood that the invention could also be useful in other industrial applications. Such systems have traditionally included a hopper bin for storing input polymer materials, means for feeding the input material to the disc mill assembly, means for carrying the processed ground material from the disc mill assembly to a sorting module, means for transporting acceptable ground material to a ground material collection area, and a means for recirculating unacceptable ground material to a second disc mill assembly for further grinding (although single disc mill assemblies are also known, and intended to be covered by the claims of this application). Most disc mill assemblies typically include a spindle, a flywheel, both a rotating disc and a stationary disc with cutting surfaces (hereafter, collectively a "grinding disk" or "grinding disks"), a means for cooling the stationary grinding disk (e.g., a waterjacket), means for introducing air into the mill, and means for adjusting a distance between two facing cutting surfaces of the grinding disks. The grinding disks can be constructed of any material chosen according to sound engineering judgment; including those having a malleable substrate.

Broadly speaking, the pulverizing system operates by moving polymer materials stored in the hopper bin into the disc mill assembly, where the grinding disks—with cutting surfaces arranged in facing operative relation—progressively reduce the size of the input materials until they are of suitable size to exit the grinding channel by virtue of centrifugal force. The ground materials are then collected, and either stored, or re-circulated for additional grinding and/or processing.

Previously, disc mill assembly grinding disks were difficult to manufacture and maintain in operational condition. In order to accomplish the progressive grinding operation referenced above, grinding disks have traditionally utilized a tapered cutting surface. Specifically, prior art pulverizing systems utilized tapered grinding disks secured to planar flywheel and water jacket assemblies. The assembly and arrangement of two grinding disks with tapered cutting surfaces in facing relation creates a grinding channel with a gap of greater height nearer the center of the grinding disks than at their outer portions. Thus, input materials enter the disc mill assembly through material input openings in the inner portions of the water jacket and grinding disk, and are pulled outward by centrifugal force through a grinding channel with a gap of ever decreasing size—a process that progressively reduces the size of the input material until it is in a substantially powder form. Unfortunately, the manufacture of grinding disks having the aforementioned taper is difficult and expensive; it would be preferable to manufacture a grinding disk with a flat cutting surface having the same functionality of a tapered grinding disk. Thus, there is a need in the art for a grinding disk with a cutting surface that is flat when manufactured, but functionally tapered when assembled into the disc mill assembly.

Additionally, in order to withstand the forces exerted during the grinding operation, grinding disks have traditionally been heavy and thick metal devices. This permitted the grinding disks to be securely bolted or otherwise attached to the water jacket and flywheel, respectively, and allowed for their periodic re-sharpening (where the thickness of the grinding disk gradually is reduced until the plate became unusable). For example, the typical grinding disk becomes degraded in the normal grinding operation, and must be either replaced or re-sharpened, after only approximately 150 hours of use. Thus, grinding disks were traditionally returned to the manufacturer for re-sharpening after a relatively short period of use, and the costs associated with maintaining a pulverizing system included both re-sharpening charges and shipping fees for regularly transporting the heavy devices round trip for maintenance. As a result, there is a need in the art for a disc mill assembly that eliminates the high re-sharpening and shipping costs associated with the traditional grinding disk by cost-effectively permitting the user to replace rather than re-sharpen the grinding disks.

The present invention provides methods and apparatuses for improved disc mill assembly that solves the aforementioned problems in the prior art.

II. SUMMARY OF THE INVENTION

According to one aspect of the present invention, a new and improved disc mill assembly for a pulverizing apparatus is provided, comprising a housing; a flywheel received in the housing and adapted for being operatively secured to an associated rotating spindle, the flywheel comprising a generally circular disc having a lower planar side; an upper grinding disk attachment side having at least two raised concentric mating members with sloped surfaces; an annular outer wall extending from the lower planar side to the upper grinding disk attachment side; and an inner wall extending from the lower planar side to the upper grinding disk attachment side and defining a central flywheel opening adapted to receive at least a portion of the associated rotating spindle.

According to another aspect of the present invention, a flywheel for a disc mill assembly of a pulverizing apparatus is provided, comprising a generally circular disc, having a lower planar side adapted for being operatively secured to an associated rotating spindle; an upper grinding disk attachment side having at least two raised concentric mating members of different heights with sloped surfaces adapted for being operatively secured to an associated grinding disk; an annular outer wall extending from the lower planar side to the upper grinding disk attachment side; and an inner wall extending from the lower planar side to the upper grinding disk attachment side and defining a central flywheel opening adapted to receive at least a portion of the associated rotating spindle.

According to yet another aspect of the present invention, a method for pulverizing materials in a tapered grinding channel of a disc mill assembly for a pulverizing apparatus is provided, comprising the steps of: (A) Providing (1) a hopper bin containing materials, operatively connected to a material input channel; (2) a housing; (3) a flywheel adapted for being operatively secured to an associated rotating spindle, the flywheel comprising a generally circular disc having: a lower planar side; an upper grinding disk attachment side having raised concentric mating members of different heights with sloped surfaces, the mating members comprising an outer mating member and an inner mating member having mounting apertures, wherein the outer mating member is of greater height than the inner mating member; an annular outer wall extending from the lower planar side to the upper grinding disk attachment side; and an inner wall extending from the lower planar side to the upper grinding disk attachment side and defining a central flywheel opening adapted to receive at least a portion of the associated rotating spindle; (4) a water jacket adapted to be operatively secured to an associated housing lid, the water jacket comprising a generally circular disc having: an upper planar side; a lower grinding disk attachment side having second raised concentric mating members of different heights with sloped surfaces, the second mating members comprising a second outer mating member and a second inner mating member having mounting apertures, wherein the second outer mating member is of greater height than the second inner mating member; a second annular outer wall extending from the upper planar side to the lower grinding disk attachment side; and a second inner wall extending from the upper planar side to the lower grinding disk attachment side and defining a material input opening adapted for receiving materials into the disc mill assembly; (5) a first grinding disk comprising a generally circular disc having a planar attachment surface, a first planar cutting surface, and mounting apertures; (6) a second grinding disk comprising a generally circular disc having a planar attachment surface, a second planar cutting surface, and mounting apertures; (7) grinding disk fasteners; (8) means for rotating the spindle; and (9) means for moving materials in the hopper bin into the associated disc mill assembly; (B) Assembling the associated disc mill assembly for the associated pulverizing apparatus by (1) operatively positioning the flywheel and the water jacket within the housing; (2) inserting at least a portion of the associated spindle into the central flywheel opening and operatively securing the lower planar side of the flywheel to the associated spindle; (3) aligning the mounting apertures of the inner mating member with the mounting apertures of the second grinding disk; positioning the planar attachment surface of the second grinding disk on the sloped surface of the outer mounting member; deforming the second grinding disk by passing grinding disk fasteners through the mounting apertures in the second grinding disk and the mounting apertures in the inner mating member and tightening the grinding disk fasteners until the second grinding disk operatively contacts the inner mating member and defines the bottom portion of a tapered grinding channel; (4) aligning the material input opening with the material input channel and operatively attaching the water jacket to the housing in a stationary position; (5) aligning the mounting apertures of the second inner mating member with the mounting apertures of the first grinding disk; positioning the planar attachment surface of the first grinding disk on the sloped surface of the second outer mounting member; deforming the first grinding disk by passing grinding disk fasteners through the mounting apertures in the first grinding disk and the mounting apertures in the second inner mating member and tightening the grinding disk fasteners until the first grinding disk operatively contacts the second inner mating member and defines the top portion of a tapered grinding channel; and (6) positioning the first and second grinding disks so their cutting surfaces are arranged in facing operative relation and the first cutting surface and the second cutting surface together define a tapered grinding channel; (C) Activating the associated disc mill assembly with a tapered grinding channel by (1) rotating the spindle; (2) moving materials from the hopper bin into the tapered grinding channel, wherein: (a) materials in the hopper bin move into the material input channel, through the material input opening, and into the tapered grinding channel; (b) materials are pulled by centrifugal force through the tapered grinding channel and pulverized to reduced size.

One advantage of this invention is that the grinding disks for the disc mill assembly can be provided at a reduced cost, whereby users of the pulverizing apparatus having the aforementioned disc mill assembly can replace worn grinding disks instead of incurring sharpening and shipping costs to maintain the pulverizing system in working condition.

Another advantage of the present invention is that the grinding disks are lighter weight, resulting in even greater costs savings to the consumer due to reduced shipping costs, and also providing better contact between the water jacket and the grinding disk for cooling purposes. Additionally, the improved grinding disks have a greater cutting surface area that provides increased material throughput.

Yet another advantage of the present invention is that overall operating costs for a pulverizing system with the improved disc mill assembly are less than comparable previous systems, because grinding disks do not have to be sent away for re-sharpening, temporary replacement grinding disks do not have to be purchased and stored, and pulverizing systems of the present invention encounter less frequent down time due to worn grinding disks.

Yet another advantage of the present invention is that manufacturing grinding disks with planar, or flat, surfaces is more cost efficient than producing grinding disks with the traditional tapered cutting surface.

Still other benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein:

FIGS. 2A through 2C are top, bottom, side cross-sectional, and enlarged plan views of the water jacket for a disc mill assembly of the present invention.

IV. DETAILED DESCRIPTION OF THE INVENTION

Figure 7:
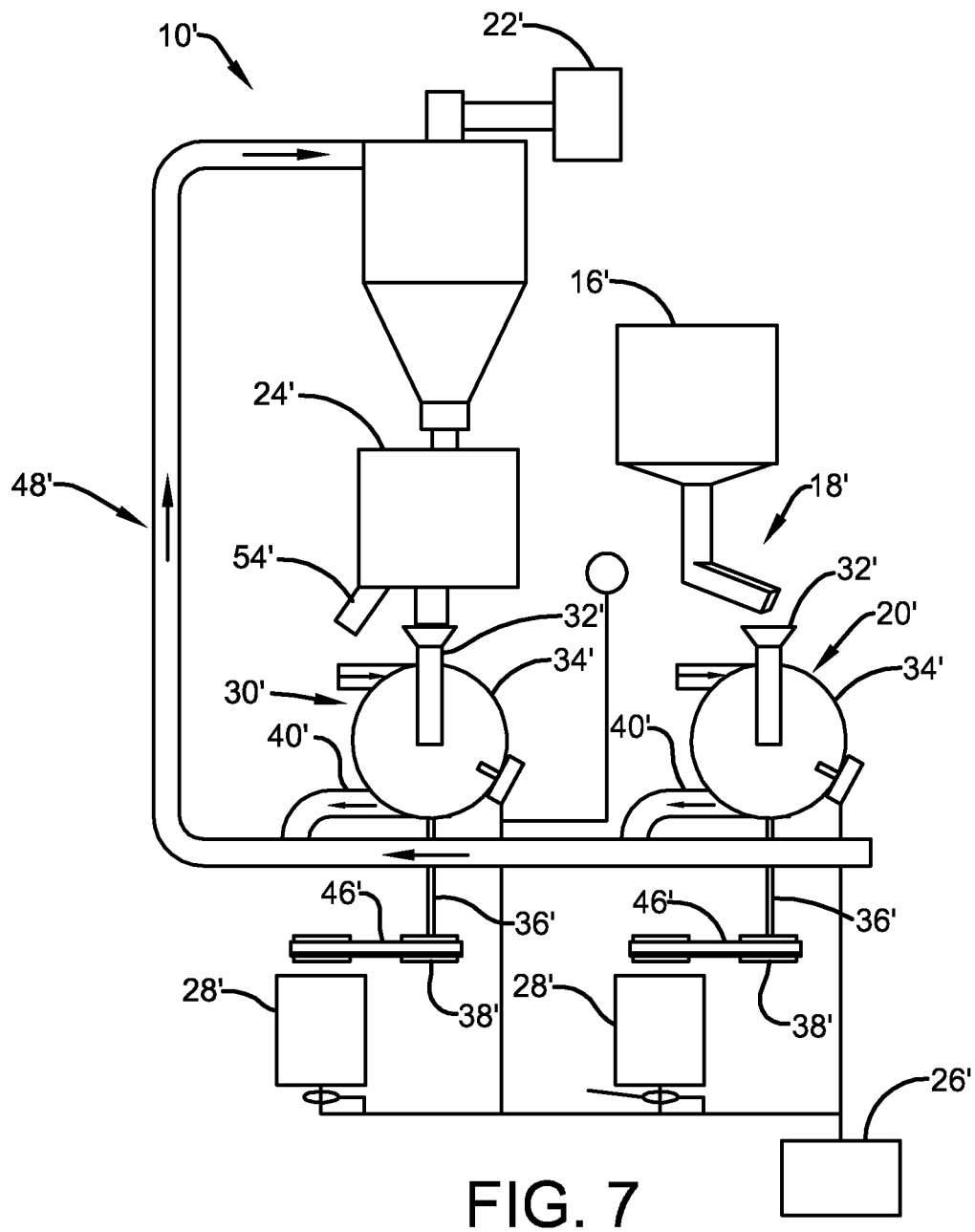
FIGS. 7 and 8 show a prior art example of the component parts and arrangement found in the typical pulverizing system.

Referring now to the drawings, wherein the showings are for purposes of illustrating prior art pulverizing systems and embodiments of the present invention only and not for purposes of limiting the same, FIG. 7 shows a prior art schematic diagram of a pulverizing system 10. Most pulverizing systems 10 (hereafter, pulverizing apparatus) utilize the following component parts: primary and secondary disc mill assemblies 20', 30', a hopper bin 16', means for moving materials from the hopper bin 16' into the disc mill assembly 20', 30' (such means typically comprising a vibrating feeder 18'), a blower 22', a sifter 24', and a control panel 26' for controlling the operation of motors 28'. Each of the disc mill assemblies 20', 30' preferably includes a material input channel 32', a housing 34', a spindle 36', a pulley 38', and a disc mill outlet 40'.

With continuing reference to FIG. 7, the control panel 26' is in communication with the vibrating feeder 18', blower 22', and motors 28'; and the motors are in communication with pulleys 38' via belts 46'. The hopper bin 16' is in communication with the vibrating feeder 18', which in turn is in communication with the primary disc mill 20' via a duct network 48'. The blower 22' is in communication with the sifter 24', and the sifter 24' is in communication with the secondary disc mill 30'.

In the prior art pulverizing assembly shown in FIG. 7, the control panel 26' starts the blower 22' to create a vacuum in the duct network 48' and starts the motors 28' which cause rotating disc blades in the disc mill assemblies 20', 30' to rotate via the belts 46', pulleys 38', and spindles 36'. Raw material (typically in either pellet or shredded form) to be ground is supplied to the hopper bin 16' and flows to the vibrating feeder 18'. Examples of raw material include Linear low-density polyethylene (LLDPE), Low-density polyethylene (LDPE), High-density polyethylene (HDPE), Polyvinyl chloride (PVC), Polybutylene terephthalate (PBT), Acrylonitrile butadiene styrene (ABS), nylons, polyesters, or other polymers; all of which are examples of conventional raw materials supplied to pulverizing mills 10. One skilled in the art will appreciate that the pulverizing system 10' may also be used to grind other materials. The speed of the vibrating feeder 18' is controlled by the control panel 26'. By varying the speed of the vibrating feeder 18', the control panel 26' controls or regulates the amount of the raw material supplied to the primary disc mill 20' and thereby the corresponding throughput of the pulverizing system 10'. The raw material flows from the vibrating feeder 18' through the material input channel 32' to the primary disc mill 20'. The primary disc mill 20' grinds the raw material into smaller particles using the rotating first grinding disk 300' attached to the flywheel 100' and a stationary second grinding disk 350' attached to the water jacket 200'. The negative pressure or vacuum in the duct network 48' removes particles from the primary disc mill 20' through the disc mill outlet 40' into the sifter 24'.

With continuing reference to FIG. 7, the sifter 24' separates particles according to size and routes particles that are smaller than a predetermined acceptable size to an exit channel 54' for transport and/or collection as deliverable stock (e.g., powder). All other particles pass from the sifter 24' through a recirculating channel 52' for re-introduction into the second disc mill 30'. The secondary disc mill 30' grinds the particles into smaller particles that are output to the duct network 48' and introduced (e.g., vacuum-fed) back into the sifter 24' in the same manner as described for the primary disc mill 20'. From the sifter 24', the particles continue recirculating through the secondary disc mill 30' until they are a size that will pass through the exit channel 54'.

Figure 8:
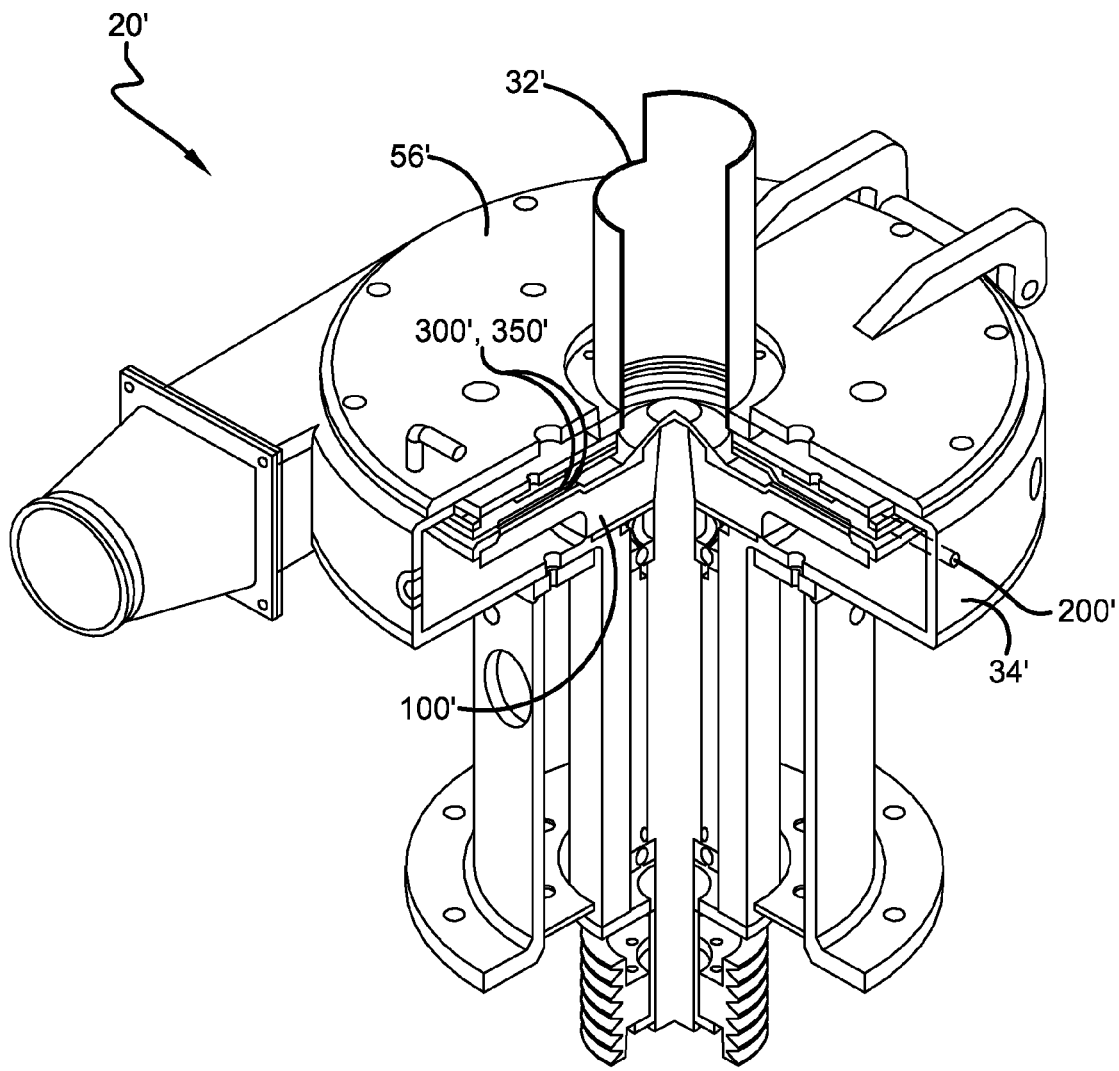
Figure 9:
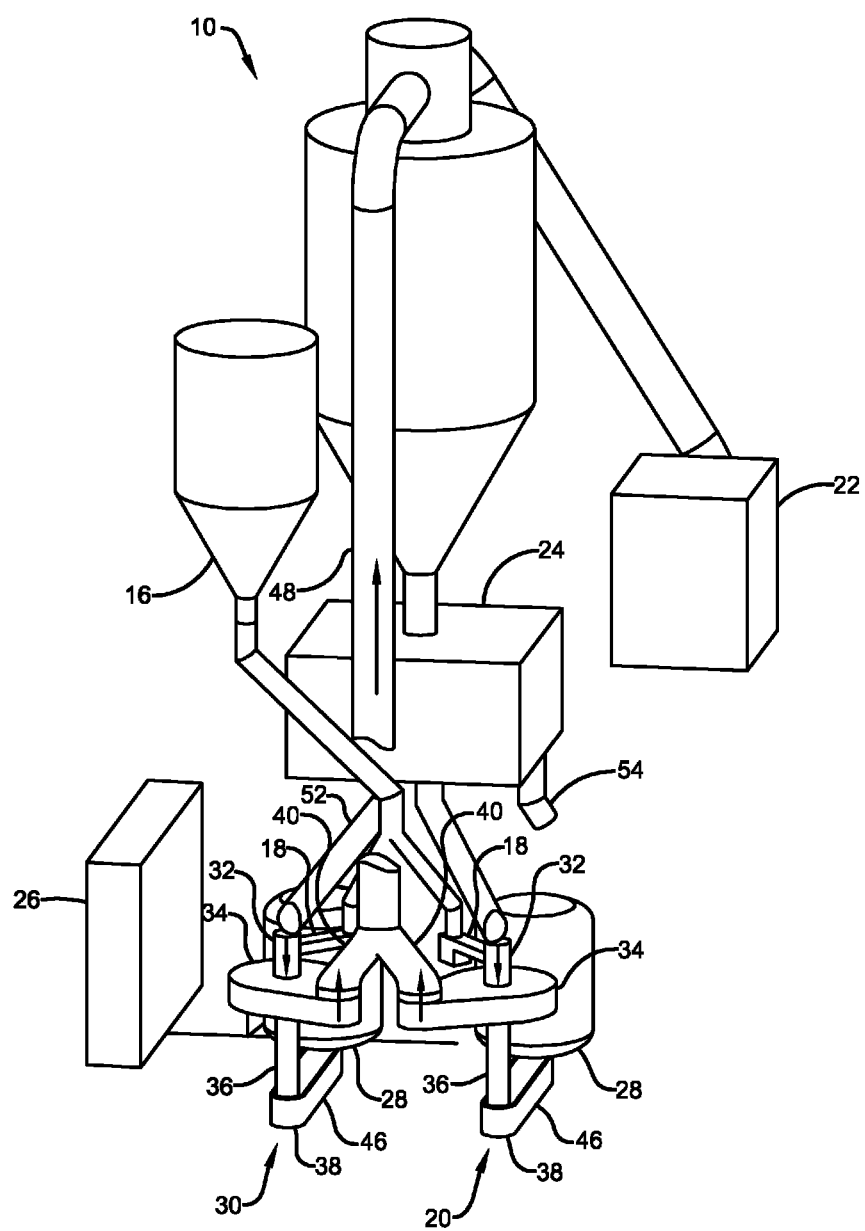
FIGS. 9 and 10 show an illustrative, but non-limiting, arrangement of the component parts found in the improved disc mill assembly for a pulverizing apparatus of the present invention.
Figure 10:
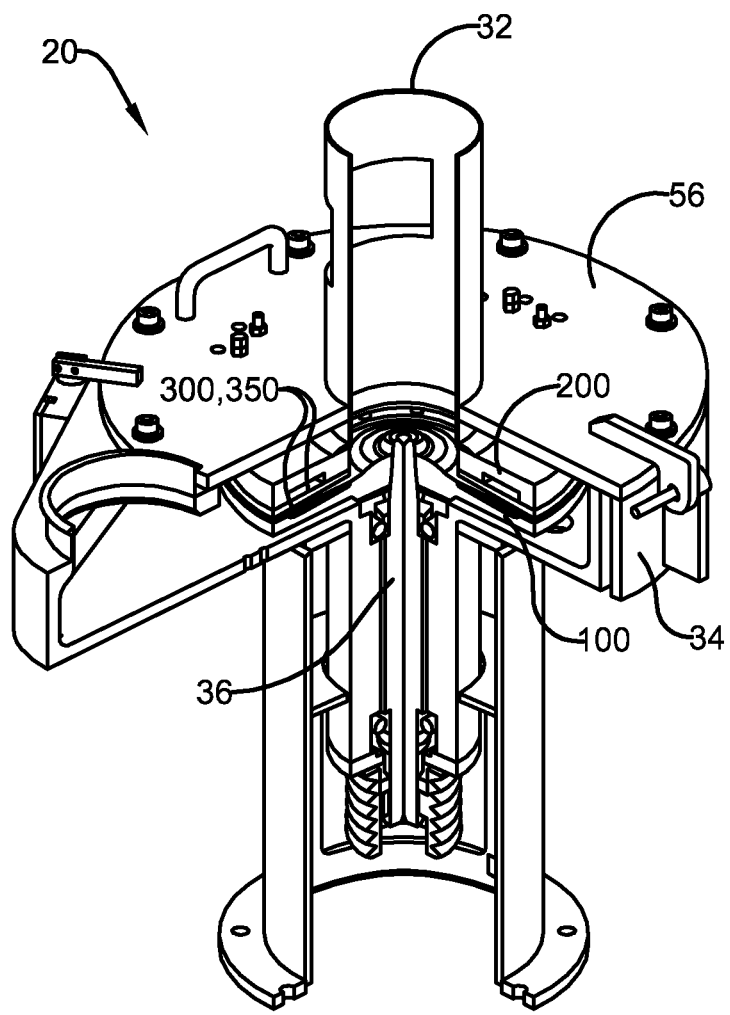

With reference to FIG. 8, a prior art example of the general arrangement of a disc mill assembly, the diagram shows the material input channel 32', housing 34', spindle 36', housing lid 56', water jacket 200', flywheel 100', and first and second grinding disks 300', 350'. The improved disc mill assembly 20', 30' for a pulverizing apparatus 10' of the present invention includes a housing 34' not dissimilar from prior art varieties (See FIG. 8).

With reference now to FIGS. 9, 10, and 1A-1C, which show a detailed view of the improved flywheel 100 of the present invention, the flywheel 100 is a generally circular disc having a lower planar side 102, and a substantially non-planar upper grinding disk attachment side 104, an annular outer wall 106 extending from the lower planar side 102 to the upper grinding disk attachment side 104, and an inner wall 108 extending from the lower planar side 102 to the upper grinding disk attachment side 104 and defining a central flywheel opening 120 adapted to receive at least a portion of an associated rotating spindle 36. The flywheel 100 is operatively secured to the rotating spindle 36, and received within the housing 34 in any manner chosen with sound engineering judgment. In some embodiments, the flywheel 100 is adapted for use with a disc mill assembly 20, while in others the flywheel 100 is claimed alone and could be used in conjunction with other devices.

Figure 1A:
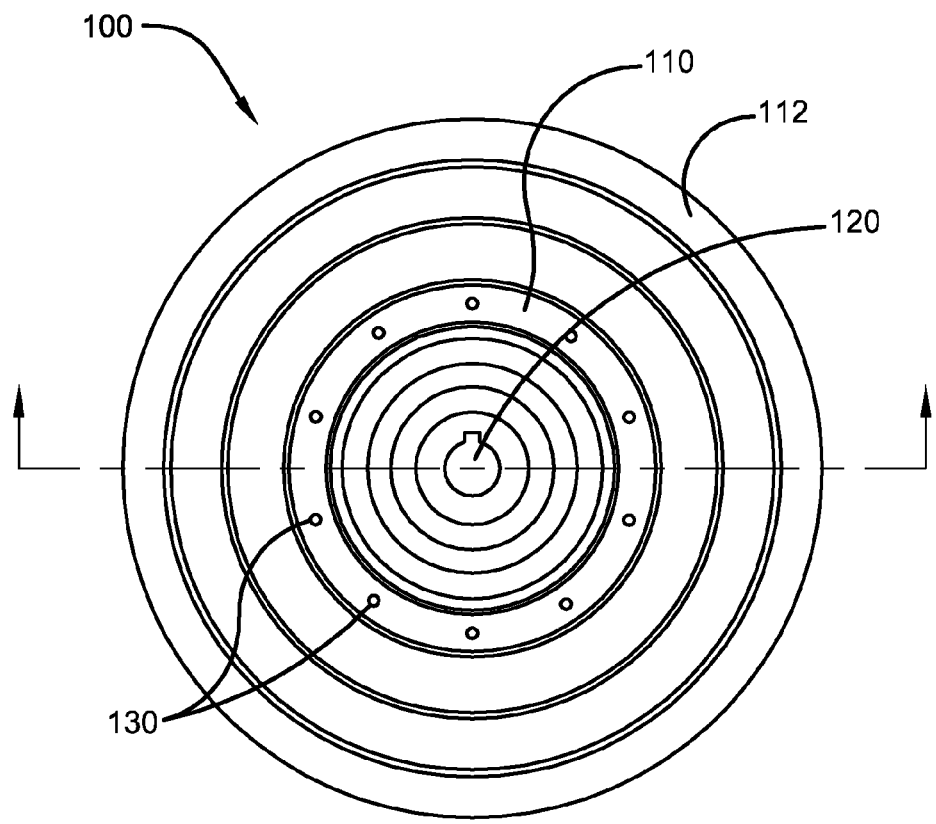
FIGS. 1A through 1C are top, side cross-sectional, and enlarged plan views showing the flywheel for a disc mill assembly of the present invention.
Figure 1B:
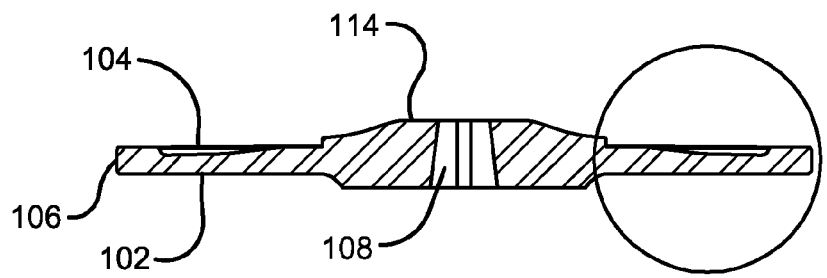
Figure 1C:
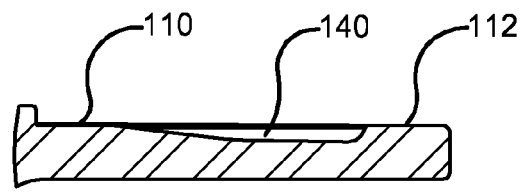
Figure 3A:
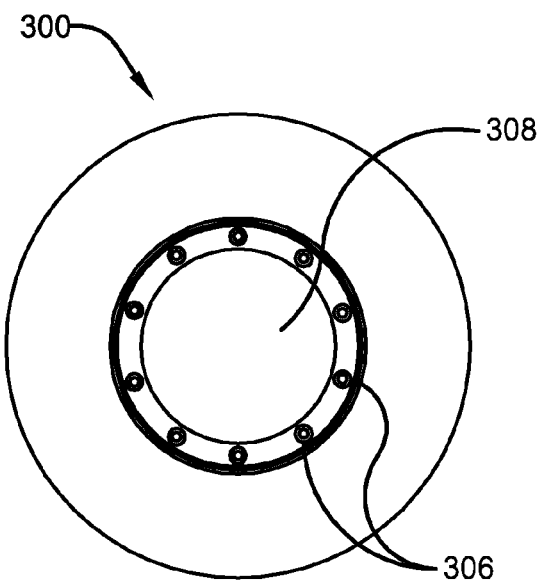
FIGS. 3A through 3D are top, side, cross-sectional, and enlarged plan views of the grinding disk for a disc mill assembly of the present invention.
Figure 3D:
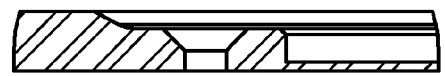
Figure 3B:
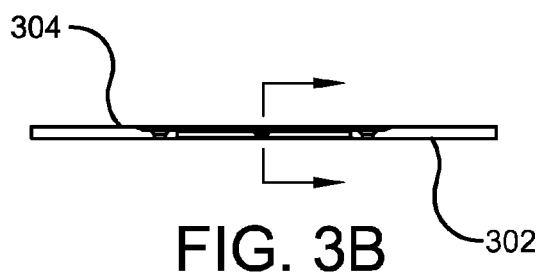
Figure 3C:

The upper grinding disk attachment side 104, has at least two raised concentric mating members 110, 112 with sloped surfaces. In one embodiment of the present invention, the raised mating members comprise an inner mating member 110 and an outer mating member 112, wherein the two mating members 110, 112 are of different heights and their sloped surfaces are both at an angle of about 0.5° and 1.5°. In one embodiment of the invention, the flywheel 100 further comprises a raised center hub 114 that facilitates the positioning of the second grinding disk 300 to the flywheel 100 (See FIG. 3A) and directs input materials into a tapered grinding channel (not shown, but described in detail below). In this embodiment, the height of the outer mating member 112 is greater than the height of the inner mating member 110, and the mating members' sloped surfaces are both angled in a downward fashion towards the center hub 114. In still other embodiments, the flywheel 100 further includes an annular cavity 140 (See FIG. 1C) disposed between the inner mating member 110 and outer mating member 112.

With reference now to FIGS. 2A-2C, which show a detailed view of the improved water jacket 200 of the disc mill assembly of the present invention, the water jacket 200 is a generally circular disc having an upper planar side 202, a substantially non-planar lower grinding disk attachment side 204, a second outer annular wall 206 extending from the upper planar side 202 to the lower grinding disk attachment side 204, and a second inner wall 208 extending from the upper planar side 202 to the lower grinding disk attachment side 204 and defining a material input opening 220 adapted for receiving materials into the disc mill assembly 200. The water jacket 200 is received in the housing 34, and operatively secured to the interior portion of the housing lid 56 in a fixed condition, in any manner chosen with sound engineering judgment.

With continuing reference to FIGS. 2A-2C, the lower grinding disk attachment side 204 has at least two raised concentric mating members 210, 212 with sloped surfaces. In one embodiment of the present invention, the raised mating members comprise a second inner mating member 210 and a second outer mating member 212, wherein the two second mating members 210, 212 are of different heights and their sloped surfaces are both at an angle of about 0.5° and 1.5°. In one embodiment of the invention, the height of the second outer mating member 212 is greater than the height of the second inner mating member 210, and the mating members sloped surfaces are both angled in a downward fashion towards the material input opening 220.

Figure 5:
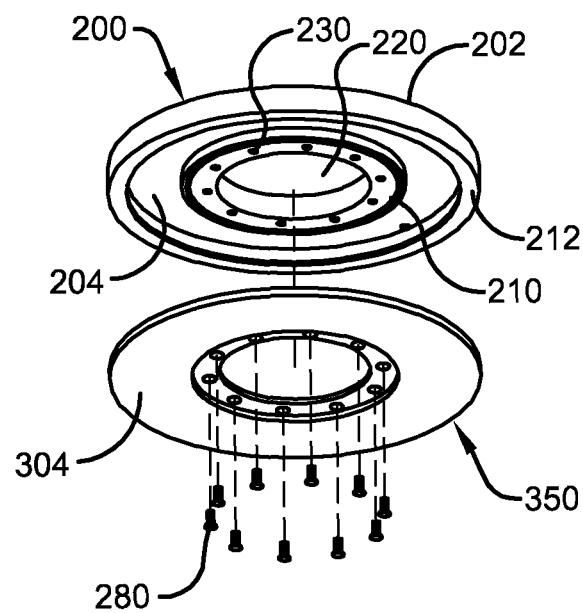
FIG. 5 is an exploded and assembled cross-sectional plan view of the grinding disk and water jacket of the present invention.
Figure 5:
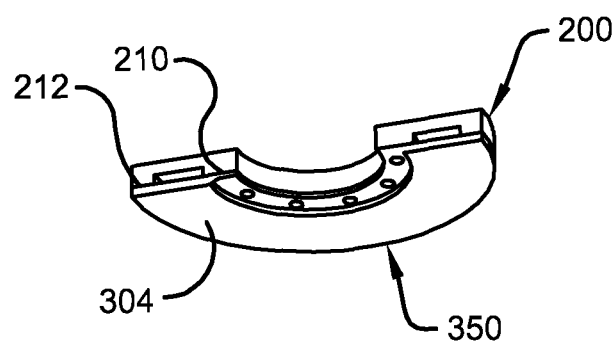
Figure 6:
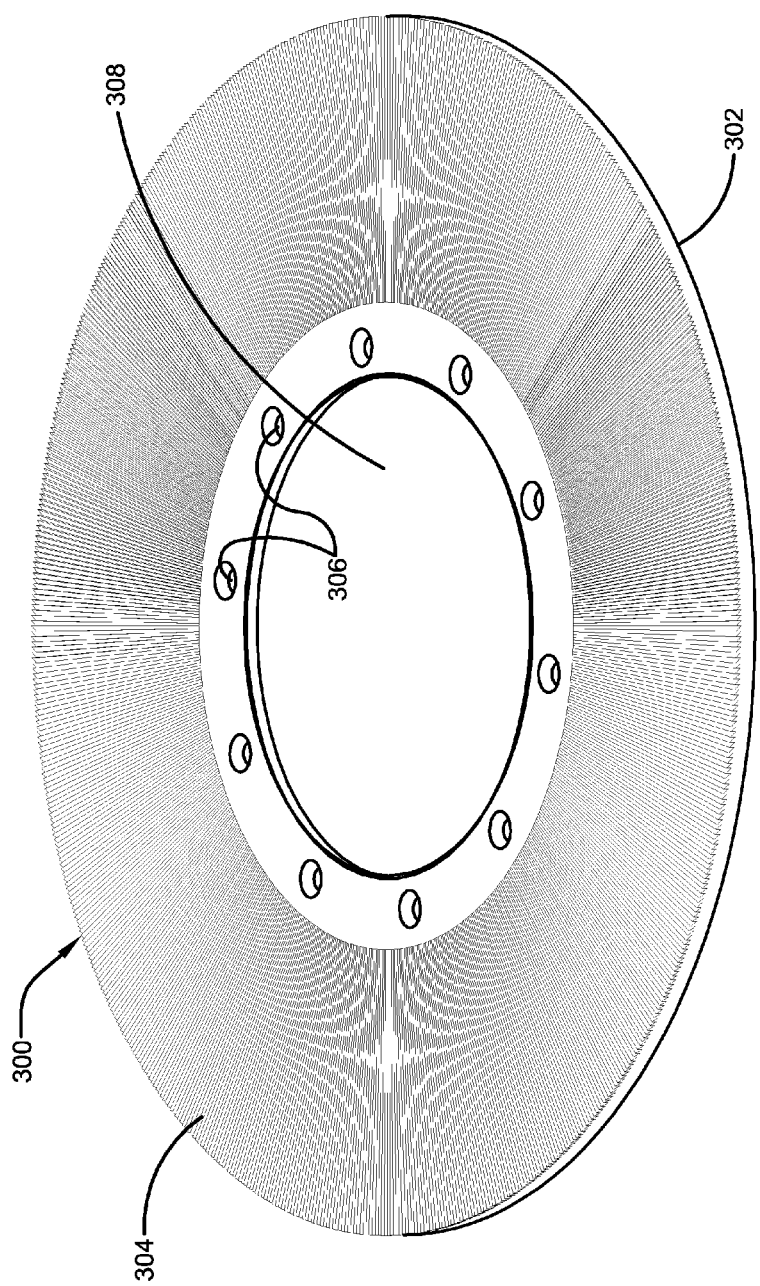
FIG. 6 is a perspective view of the planar grinding disk of the present invention.

With reference now to FIGS. 3A-3D, in some embodiments of the present invention the disc mill assembly 20 also includes first and second grinding disks 300, 350 designed and intended to be arranged in facing operative relation. The first grinding disk 300 is a generally circular disc adapted to be operatively disposed (attached) adjacent to the flywheel 100, via any means chosen according to sound engineering judgment. The second grinding disk 350 (See FIG. 5) is a generally circular disc adapted to be operatively disposed (attached) adjacent to the water jacket 200, via any means chosen according to sound engineering judgment. The first and second grinding disks 300, 350 both have planar attachment surfaces 302 and planar cutting surfaces 304. As shown in FIG. 6, the planar cutting surface 304 of the first grinding disk 300 includes a plurality of cutting edges extending radially from a central vertical axis at a predetermined relatively constant angle toward the outer periphery of the cutting surface 304. This type of cutting surface utilizes cutting edges well known in the industry, and traditionally referred to as teeth. It is well known that the number of teeth can vary, as well as the various angles and pitches associated with the teeth.

With reference now to FIGS. 3A-3D and FIGS. 9 and 10, in one embodiment of the present invention, the first and second grinding disks 300, 350 both have mounting apertures 306 and center holes 308. In the first grinding disk 300, the center hole 308 is adapted to receive at least portions of the raised center hub 114 and rotating spindle 36. In the second grinding disk 350, the center hole 308 is adapted to align with the water jacket's material input opening 220. Additionally, the flywheel 100 and water jacket 200 have mounting apertures 130, 230. In this configuration, the first grinding disk 300 is operatively secured to the flywheel 100 by passing grinding disk fasteners (280) through the mounting apertures of both the flywheel and first grinding disk 130, 306; similarly, the second grinding disk 350 is operatively secured to the water jacket 200 by passing fasteners (280) through the mounting apertures of both the water jacket and the second grinding disk 230, 306.

In some embodiments of the present invention, the grinding disks have a thickness of less than ⅝ inch (1.58 cm). In still further embodiments of the present invention, the grinding disks have a thickness of less than ½ inch (1.27 cm). In yet further embodiments of the present invention, the grinding disks have a thickness of less than ⅜ inch (1.0 cm). In still further embodiments, the grinding disks 300, 350 are constructed from a material including at least about 50% by weight nickel, at least about 15% by weight of cobalt, and at least about 13% by weight of chromium. Broadly speaking, the grinding disk's 300, 350 for a disc mill assembly 20, 30 of the present invention are substantially lighter, due to reduced thickness, than previous blades—resulting in reduced shipping costs from the manufacturer to the consumer. Additionally, the grinding disks of the present invention retain the strength of thicker and heavier blades, but at a cost that enables users to merely dispose of worn grinding disks rather than continually sending the grinding disks away to be re-sharpened.

In one embodiment, a method for pulverizing materials in a disc mill assembly having a tapered grinding channel created by the assembly and use of the devices and components (described above) demonstrates the advantages of the present invention. In contrast to the prior art disc mill assemblies—that used tapered grinding disks mounted onto planar flywheels and water jacket's—the present invention utilizes planar grinding disks 300, 350 that are substantially deformable so as to define a tapered grinding channel when properly mounted on the improved flywheel 100 and water jacket 200, respectively. Specifically, the flywheel 100 and water jacket 200 have sloped surfaces and differences in mating member height that deform an attached grinding disk 300, 350 so as to create the top and bottom portions of a tapered grinding channel.

The method for pulverizing materials in a tapered grinding channel is accomplished by first operatively positioning the flywheel 100 and water jacket 200 of the invention within the housing 34 in a manner wherein their respective grinding disk attachment sides 104, 204 are in facing operative relation. For positioning the flywheel 100, this includes inserting portions of the spindle 36 within the center hub 114 and central flywheel opening 120 so as to position the upper grinding disk attachment side 104 in facing relation to a water jacket 200. For positioning the water jacket 200, this involves aligning the material input opening 220 with the material input channel 32, and fixedly securing the water jacket to the housing lid 56 in a stationary position wherein the lower grinding disk attachment side 204 is in facing operative relation to the flywheel's upper grinding disk attachment side 104.

Figure 4A:
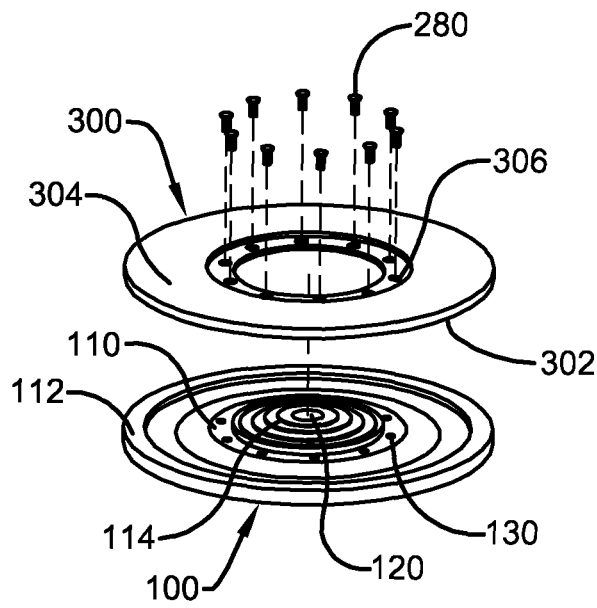
FIGS. 4A and 4B are exploded, assembled cross-sectional, and enlarged cross-sectional views of the grinding disk and flywheel of the present invention.
Figure 4B:
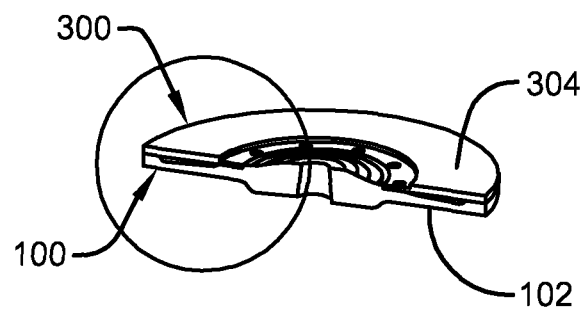
Figure 4B:
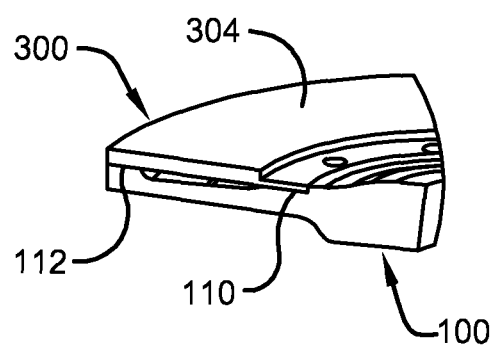

Next, as shown in FIG. 4A and in greater detail in FIG. 4B, the planar attachment surface 302 of the first grinding disk 300 is positioned on the sloped surface of the outer mating member 112, and the first grinding disk 300 is attached to the flywheel's upper attachment side 104 by aligning—and then passing grinding disk fasteners 280 through—the mounting apertures 306 of the first grinding disk 300 and the mounting apertures 130 of the inner mating member 110. Similarly, as shown in FIG. 5, the planar attachment surface 302 of the second grinding disk 350 is positioned on the sloped surface of the second outer mating member 212, and the second grinding disk 350 is attached to the water jacket's lower grinding disk attachment side 204 by aligning and then passing grinding disk fasteners 280 through—the mounting apertures 306 of the second grinding disk 350 and the mounting apertures 230 of the second inner mating member 210.

The tapered grinding channel is created when previously planar grinding disks 300, 350 are attached to the flywheel 100 and water jacket 200 in the manner described above. The outer mating member 112 and second outer mating member 212 have a greater height than the inner mating member 110 and second inner mating member 210. As a result, the first grinding disk 300 is deformed into a bottom portion of a tapered grinding channel when grinding disk fasteners 280 tighten the first grinding disk 300 until it's planar attachment surface 302 also comes into contact with the flywheel's inner mating member 110. Similarly, the second grinding disk 350 is deformed into the top portion of a tapered grinding channel when grinding disk fasteners 280 tighten the second grinding disk 350 until it's planar attachment surface 302 also comes into contact with the water jacket's second inner mating member 210. Thus, when the disc mill assembly's housing 34 is operatively assembled, the first grinding disk 300 and second grinding disk 350 are in facing operative relation, and their respective cutting surfaces 304, 304 create a tapered grinding channel having a grinding gap of greater height at the position where the grinding disks 300, 350 are attached to the inner mating member 110 and second inner mating member 210 than at the position where the grinding disks 300, 350 are attached to the outer mating member 112 and second outer mating member 212.

When the control panel 26 initiates the motor 28, blower 22, and other pulverizing apparatus components to move material from the hopper bin 16 into the disc mill assembly 20 and the tapered grinding channel, as described in greater detail above, the method for pulverizing materials claimed below is completed.

The embodiments have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

We claim:

1. A method comprising the steps of:
   (A) providing a disc mill assembly comprising:
      (1) a housing;
      (2) a flywheel comprising a generally circular disc having first and second sides, wherein the first side has a first relatively inner raised mating member that is raised to a first height and a second relatively outer raised mating member that is raised to a second height, wherein the first height is different than the second height;
      (3) a water jacket comprising a generally circular disc having first and second sides, wherein the first side has a first relatively inner raised mating member that is raised to a first height and a second relatively outer raised mating member that is raised to a second height, wherein the first height is different than the second height;
      (4) a first grinding disk comprising a generally circular disc having first and second sides, wherein the second side comprises a cutting surface;
      (5) a second grinding disk comprising a generally circular disc having first and second sides, wherein the second side comprises a cutting surface;
   (B) attaching the first side of the first grinding disk to the first side of the flywheel wherein the first side of the first grinding disk contacts the first relatively inner raised mating member and the second relatively outer raised mating member of the first side of the flywheel to thereby deform the shape of the cutting surface of the first grinding disk;
   (C) attaching the first side of the second grinding disk to the first side of the water jacket wherein the first side of the first grinding disk contacts the first relatively inner raised mating member and the second relatively outer raised mating member of the first side of the water jacket to thereby deform the shape of the cutting surface of the second grinding disk;
   (D) positioning the flywheel, water jacket, first grinding disk and second grinding disk within the housing wherein:
      (1) the second side of the flywheel is secured to an associated rotating spindle;
      (2) the flywheel and the first grinding disk are rotatable within and with respect to the housing;
      (3) the second side of the water jacket is fixedly secured to the housing;
      (4) the cutting surfaces of the first and second grinding disks face each other; and,
      (5) a tapered grinding channel, that is used to grind associated materials when the disc mill assembly is operated, is created between and defined by the cutting surfaces of the first and second grinding disks by the deformation of the first and second grinding disks.

2. The method of claim 1 wherein:
step (A) comprises the steps of: providing the first and second sides of the first grinding disk to be substantially planar; and, providing the first and second sides of the second grinding disk to be substantially planar;
step (B) comprises the step of: deforming the second side of the first grinding disk into a non-planar shape; and,
step (C) comprises the step of: deforming the second side of the second grinding disk into a non-planar shape.

3. The method of claim 1 wherein:
step (A) comprises the steps of: proving the flywheel with a plurality of mounting apertures formed on its first relatively inner raised mating member; and, proving the water jacket with a plurality of mounting apertures formed on its first relatively inner raised mating member;
step (B) comprises the step of: passing fasteners through the mounting apertures formed in the flywheel and through mounting apertures formed in the first grinding disk; and,
step (C) comprises the step of: passing fasteners through the mounting apertures formed in the water jacket and through mounting apertures formed in the second grinding disk.

4. The method of claim 1 wherein:
step (A) comprises the steps of: providing the second height to be greater than the first height for the flywheel; and, providing the second height to be greater than the first height for the water jacket; and,
step (D) comprises the step of: creating the tapered grinding channel to have a greater height at the position where the first and second grinding disks contact the first relatively inner raised mating members of the flywheel and water jacket, respectively, than at the position where the first and second grinding disks contact the second relatively outer raised mating members of the flywheel and water jacket, respectively.

5. The method of claim 1 wherein:
step (A) comprises the steps of: providing the first relatively inner raised mating member and the second relatively outer raised mating member of the flywheel to have sloped surfaces that are angled at least 0.4 degrees in a downward direction towards the center of the flywheel; and, providing the first relatively inner raised mating member and the second relatively outer raised mating member of the water jacket to have sloped surfaces that are angled at least 0.4 degrees in a downward direction towards the center of the water jacket;
step (B) comprises the step of: angling the first grinding disk to match the sloped surfaces of the first relatively inner raised mating member and the second relatively outer raised mating member of the flywheel; and,
step (C) comprises the step of: angling the second grinding disk to match the sloped surfaces of the first relatively inner raised mating member and the second relatively outer raised mating member of the water jacket.

6. The method of claim 1 wherein:
step (A) comprises the steps of: providing the first and second grinding disks with center holes; providing the flywheel with a center hub; and, providing the water jacket with a center hole;
step (B) comprises the step of: inserting the center hub of the flywheel within the center hole of the first grinding disk; and,
step (C) comprises the step of: aligning the center hole of the water jacket with the center hole of the second grinding disk.

7. A method for pulverizing material with the operation of a disc mill assembly having (1) a housing; (2) a flywheel comprising a generally circular disc having first and second sides, wherein the first side has a first relatively inner raised mating member that is raised to a first height and a second relatively outer raised mating member that is raised to a second height, wherein the first height is different than the second height; (3) a water jacket comprising a generally circular disc having first and second sides, wherein the first side has a first relatively inner raised mating member that is raised to a first height and a second relatively outer raised mating member that is raised to a second height, wherein the first height is different than the second height; (4) a first grinding disk comprising a generally circular disc having first and second sides, wherein the second side comprises a cutting surface; (5) a second grinding disk comprising a generally circular disc having first and second sides, wherein the second side comprises a cutting surface, the first side of the first grinding disk being attached to the first side of the flywheel, wherein the first side of the first grinding disk contacts the first relatively inner raised mating member and the second relatively outer raised mating member of the first side of the flywheel to thereby deform the shape of the cutting surface of the first grinding disk, the first side of the second grinding disk being attached to the first side of the water jacket, wherein the first side of the first grinding disk contacts the first relatively inner raised mating member and the second relatively outer raised mating member of the first side of the water jacket to thereby deform the shape of the cutting surface of the second grinding disk, the flywheel, the water jacket, the first grinding disk and the second grinding disk being within the housing, the second side of the flywheel being secured to an associated rotating spindle, the flywheel and the first grinding disk are rotatable within and with respect to the housing, the second side of the water jacket being fixedly secured to the housing, the cutting surfaces of the first and second grinding disks facing each other, a tapered grinding channel adapted to grind associated materials when the disc mill assembly is operated, the tapered grinding channel being formed between and defined by the cutting surfaces of the first and second grinding disks by the deformation of the first and second grinding disks, the housing having an input opening and an outlet opening; the method comprising the steps:
(1) moving initial material into the housing through the input opening and into a relatively larger area of the tapered grinding channel;
(2) rotating the flywheel and first grinding disk with respect to the second grinding disk to grind the initial material into partially ground material;
(3) moving the partially ground material through the tapered grinding channel to a relatively smaller area of the tapered grinding channel as the flywheel and first grinding disk continue to rotate with respect to the second grinding disk to grind the partially ground material into further ground material; and,
(4) moving the further ground material out of the housing through the outlet opening.

8. A method of pulverizing associated material with
a pulverizing system comprising:
a first disc mill assembly comprising:
(a) a housing an inlet opening and an outlet opening;
(b) a flywheel comprising a generally circular disc having first and second sides, wherein the first side has a first relatively inner raised mating member that is raised to a first height and a second relatively outer raised mating member that is raised to a second height, wherein the first height is different than the second height;
(c) a water jacket comprising a generally circular disc having first and second sides, wherein the first side has a first relatively inner raised mating member that is raised to a first height and a second relatively outer raised mating member that is raised to a second height, wherein the first height is different than the second height;
(d) a first grinding disk comprising a generally circular disc having first and second sides, wherein the second side comprises a cutting surface;
(e) a second grinding disk comprising a generally circular disc having first and second sides, wherein the second side comprises a cutting surface;
(1) the first side of the first grinding disk being attached to the first side of the flywheel wherein the first side of the first grinding disk contacts the first relatively inner raised mating member and the second relatively outer raised mating member of the first side of the flywheel to thereby deform the shape of the cutting surface of the first grinding disk;
(2) the first side of the second grinding disk being attached to the first side of the water jacket wherein the first side of the first grinding disk contacts the first relatively inner raised mating member and the second relatively outer raised mating member of the first side of the water jacket to thereby deform the shape of the cutting surface of the second grinding disk; and,
(3) the flywheel, the water jacket, the first grinding disk and the second grinding disk being positioned within the housing wherein:
(a) the second side of the flywheel is secured to a first rotating spindle;
(b) the flywheel and the first grinding disk are rotatable within and with respect to the housing;
(c) the second side of the water jacket is fixedly secured to the housing;
(d) the cutting surfaces of the first and second grinding disks face each other; and,
(e) a tapered grinding channel is created between and defined by the cutting surfaces of the first and second grinding disks by the deformation of the first and second grinding disks;

the method comprising the steps of:
(1) moving initial associated material into the housing through the input opening and into a relatively larger area of the tapered grinding channel;
(2) rotating the flywheel and first grinding disk with respect to the second grinding disk to grind the initial associated material into partially ground associated material;
(3) moving the partially ground associated material through the tapered grinding channel to a relatively smaller area of the tapered grinding channel as the flywheel and first grinding disk continue to rotate with respect to the second grinding disk to grind the partially ground associated material into further ground associated material; and,
(4) moving the further ground associated material out of the housing through the outlet opening.

9. The method of claim 8 wherein
the first and second sides of the first grinding disk are substantially planar and the first and second sides of the second grinding disk are substantially planar;
the second side of the first grinding disk has a non-planar shape; and,
the second side of the second grinding disk has a non-planar shape.

10. The method of claim 8 wherein
the flywheel has a plurality of mounting apertures formed on its first relatively inner raised mating member; and, the water jacket has a plurality of mounting apertures formed on its first relatively inner raised mating member;
a first plurality of fasteners pass through the mounting apertures formed in the flywheel and through mounting apertures formed in the first grinding disk; and,
a second plurality of fasteners pass through the mounting apertures formed in the water jacket and through mounting apertures formed in the second grinding disk.

11. The method of claim 8 wherein:
the second height is greater than the first height for the flywheel; and, the second height is greater than the first height for the water jacket; and,
the tapered grinding channel has a greater height at the position where the first and second grinding disks contact the first relatively inner raised mating members of the flywheel and water jacket, respectively, than at the position where the first and second grinding disks contact the second relatively outer raised mating members of the flywheel and water jacket, respectively.

12. The method of claim 8 wherein
the first relatively inner raised mating member and the second relatively outer raised mating member of the flywheel have sloped surfaces that are angled at least 0.4 degrees in a downward direction towards the center of the flywheel; and, the first relatively inner raised mating member and the second relatively outer raised mating member of the water jacket to have sloped surfaces that are angled at least 0.4 degrees in a downward direction towards the center of the water jacket; and
the first grinding disk is angled to match the sloped surfaces of the first relatively inner raised mating member and the second relatively outer raised mating member of the flywheel; and,
the second grinding disk is angled to match the sloped surfaces of the first relatively inner raised mating member and the second relatively outer raised mating member of the water jacket.

13. The method of claim 8 wherein
the first and second grinding disks have center holes; the flywheel has a center hub; and the water jacket has a center hole; and
the center hub of the flywheel is inserted within the center hole of the first grinding disk; and,
the center hole of the water jacket is aligned with the center hole of the second grinding disk.

14. The method of pulverizing associated material of claim 8
wherein the pulverizing has
a second disc mill assembly comprising:
(a) a housing an inlet opening and an outlet opening;
(b) a flywheel comprising a generally circular disc having first and second sides, wherein the first side has a first relatively inner raised mating member that is raised to a first height and a second relatively outer raised mating member that is raised to a second height, wherein the first height is different than the second height;
(c) a water jacket comprising a generally circular disc having first and second sides, wherein the first side has a first relatively inner raised mating member that is raised to a first height and a second relatively outer raised mating member that is raised to a second height, wherein the first height is different than the second height;
(d) a first grinding disk comprising a generally circular disc having first and second sides, wherein the second side comprises a cutting surface;
(e) a second grinding disk comprising a generally circular disc having first and second sides, wherein the second side comprises a cutting surface;
(1) the first side of the first grinding disk is attached to the first side of the flywheel wherein the first side of the first grinding disk contacts the first relatively inner raised mating member and the second relatively outer raised mating member of the first side of the flywheel to thereby deform the shape of the cutting surface of the first grinding disk;
(2) the first side of the second grinding disk is attached to the first side of the water jacket wherein the first side of the first grinding disk contacts the first relatively inner raised mating member and the second relatively outer raised mating member of the first side of the water jacket to thereby deform the shape of the cutting surface of the second grinding disk; and,
(3) the flywheel, the water jacket, the first grinding disk and the second grinding disk are positioned within the housing;
(a) the second side of the flywheel is secured to a second rotating spindle;
(b) the flywheel and the first grinding disk are rotatable within and with respect to the housing;
(c) the second side of the water jacket is fixedly secured to the housing;
(d) the cutting surfaces of the first and second grinding disks face each other; and,
(e) a tapered grinding channel is created between and defined by the cutting surfaces of the first and second grinding disks by the deformation of the first and second grinding disks;
the method further comprising:
(C) determining that a portion of the further ground associated material is secondary associated material that requires further grinding; and,
(D) operating the second disc mill assembly by:
(1) moving the secondary associated material into the housing through the input opening and into a relatively larger area of the tapered grinding channel;
(2) rotating the flywheel and first grinding disk with respect to the second grinding disk to grind the secondary associated material into additionally ground associated material;
(3) moving the additionally ground associated material through the tapered grinding channel to a relatively smaller area of the tapered grinding channel as the flywheel and first grinding disk continue to rotate with respect to the second grinding disk to grind the additionally ground associated material into finely ground associated material; and,
(4) moving the finely ground associated material out of the housing through the outlet opening.

15. A method comprising the steps of:
(A) providing a disc mill assembly comprising:
(1) a housing;
(2) a flywheel comprising a generally circular disc having first and second sides, wherein the first side has a first relatively inner raised mating member that is raised to a first height and a second relatively outer raised mating member that is raised to a second height, wherein the first height is different than the second height, wherein the first relatively inner raised mating member and the second relatively outer raised mating member are arcuate and concentric;

(3) a water jacket comprising a generally circular disc having first and second sides, wherein the first side has a first relatively inner raised mating member that is raised to a first height and a second relatively outer raised mating member that is raised to a second height, wherein the first height is different than the second height, wherein the first relatively inner raised mating member and the second relatively outer raised mating member are arcuate and concentric;

(4) a first grinding disk comprising a generally circular disc having first and second sides that are substantially planar, wherein the second side comprises a cutting surface;

(5) a second grinding disk comprising a generally circular disc having first and second sides that are substantially planar, wherein the second side comprises a cutting surface, (B) attaching the first side of the first grinding disk to the first side of the flywheel wherein the first side of the first grinding disk contacts the first relatively inner raised mating member and the second relatively outer raised mating member of the first side of the flywheel to thereby deform the shape of the cutting surface of the first grinding disk into a non-planar shape;

(C) attaching the first side of the second grinding disk to the first side of the water jacket wherein the first side of the first grinding disk contacts the first relatively inner raised mating member and the second relatively outer raised mating member of the first side of the water jacket to thereby deform the shape of the cutting surface of the second grinding disk into a non-planar shape;

(D) positioning the flywheel, water jacket, first grinding disk and second grinding disk within the housing wherein:

(1) the second side of the flywheel is secured to an associated rotating spindle;

(2) the flywheel and the first grinding disk are rotatable within and with respect to the housing;

(3) the second side of the water jacket is fixedly secured to the housing;

(4) the cutting surfaces of the first and second grinding disks face each other; and, (5) a tapered grinding channel, that is used to grind associated materials when the disc mill assembly is operated, is created between and defined by the cutting surfaces of the first and second grinding disks by the deformation of the first and second grinding disks.

16. The method of claim 15 wherein:

step (A) comprises the steps of: providing the second height to be greater than the first height for the flywheel; and, providing the second height to be greater than the first height for the water jacket; and, step (D) comprises the step of: creating the tapered grinding channel to have a greater height at the position where the first and second grinding disks contact the first relatively inner raised mating members of the flywheel and water jacket, respectively, than at the position where the first and second grinding disks contact the second relatively outer raised mating members of the flywheel and water jacket, respectively.

17. The method of claim 16 wherein:

step (A) comprises the steps of: providing the first relatively inner raised mating member and the second relatively outer raised mating member of the flywheel to have sloped surfaces that are angled at least 0.4 degrees in a downward direction towards the center of the flywheel; and, providing the first relatively inner raised mating member and the second relatively outer raised mating member of the water jacket to have sloped surfaces that are angled at least 0.4 degrees in a downward direction towards the center of the water jacket;

step (B) comprises the step of: angling the first grinding disk to match the sloped surfaces of the first relatively inner raised mating member and the second relatively outer raised mating member of the flywheel; and, step (C) comprises the step of: angling the second grinding disk to match the sloped surfaces of the first relatively inner raised mating member and the second relatively outer raised mating member of the water jacket.

18. The method of claim 17 wherein:

step (A) comprises the steps of: providing the first and second grinding disks with center holes; providing the flywheel with a center hub; and, providing the water jacket with a center hole;

step (B) comprises the step of: inserting the center hub of the flywheel within the center hole of the first grinding disk; and, step (C) comprises the step of: aligning the center hole of the water jacket with the center hole of the second grinding disk.

19. The method of claim 18 wherein:

step (A) comprises the steps of: providing the flywheel with a plurality of mounting apertures formed on its first relatively inner raised mating member; and, proving the water jacket with a plurality of mounting apertures formed on its first relatively inner raised mating member;

step (B) comprises the step of: passing fasteners through the mounting apertures formed in the flywheel and through mounting apertures formed in the first grinding disk; and, step (C) comprises the step of: passing fasteners through the mounting apertures formed in the water jacket and through mounting apertures formed in the second grinding disk.

20. The method of claim 19 wherein:

step (A) comprises the steps of: providing the housing with an input opening and an outlet opening; and, the method further comprises the step of operating the disc mill assembly to pulverize material by:

(1) moving initial material into the housing through the input opening and into a relatively larger area of the tapered grinding channel;

(2) rotating the flywheel and first grinding disk with respect to the second grinding disk to grind the initial material into partially ground material;

(3) moving the partially ground material through the tapered grinding channel to a relatively smaller area of the tapered grinding channel as the flywheel and first grinding disk continue to rotate with respect to the second grinding disk to grind the partially ground material into further ground material; and, (4) moving the further ground material out of the housing through the outlet opening.

* * * * *